United States Patent
Nelson

(10) Patent No.: US 10,125,873 B2
(45) Date of Patent: Nov. 13, 2018

(54) VALVE ASSEMBLY WITH ROTATABLE ELEMENT

(71) Applicant: GE AVIATION SYSTEMS, LLC, Grand Rapids, MI (US)

(72) Inventor: David Allen Nelson, Florence, SC (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 15/433,187

(22) Filed: Feb. 15, 2017

(65) Prior Publication Data

US 2018/0231129 A1    Aug. 16, 2018

(51) Int. Cl.
  *F16K 1/22*   (2006.01)
  *F16K 31/524*   (2006.01)
  *F16K 31/528*   (2006.01)

(52) U.S. Cl.
  CPC .......... *F16K 1/221* (2013.01); *F16K 31/5282* (2013.01); *F16K 31/52441* (2013.01)

(58) Field of Classification Search
  CPC ............... F16K 1/221; F16K 31/52441; F16K 31/5282; F16K 31/528
  USPC ........ 251/305–308, 251–263, 58, 229; 92/31
  See application file for complete search history.

(56) References Cited

U.S. PATENT DOCUMENTS

| | | | | |
|---|---|---|---|---|
| 2,975,976 A | * | 3/1961 | Smith ................ | G05D 16/2093 251/58 |
| 2,998,805 A | * | 9/1961 | Usab ..................... | F15B 15/068 251/58 |
| 3,184,214 A | * | 5/1965 | King .................... | F16K 31/5282 251/229 |
| 3,450,382 A | * | 6/1969 | Calim ................... | F15B 15/068 251/58 |
| 4,193,337 A | * | 3/1980 | Disdier ..................... | F01B 3/04 92/31 |
| 4,230,025 A | * | 10/1980 | Caliri ................... | F15B 15/068 92/31 |
| 4,241,897 A | * | 12/1980 | Maezawa ................ | F16K 1/221 251/229 |
| 4,504,038 A | * | 3/1985 | King ....................... | F16K 1/221 137/75 |
| 4,634,094 A | * | 1/1987 | Geiser ....................... | F16K 1/24 251/229 |
| 4,967,997 A | | 11/1990 | Hines et al. | |
| 6,113,063 A | * | 9/2000 | Takahashi ................. | F02D 9/06 251/308 |
| 6,793,194 B1 | | 9/2004 | Grinberg | |
| 7,540,467 B2 | | 6/2009 | Roundy | |
| 8,667,887 B2 | * | 3/2014 | Wiedenmann ........ | F15B 15/068 251/229 |
| 2008/0203337 A1 | | 8/2008 | Roundy | |

* cited by examiner

*Primary Examiner* — John Bastianelli

(74) *Attorney, Agent, or Firm* — GE Aviation Systems LLC; William Andes

(57) ABSTRACT

A valve assembly and method for rotating a valve assembly including a valve element disposed in a flow path and configured to rotate between an opened position and a closed position, wherein the valve element closes the flow path. A mechanical linkage is connected to the valve element where forces are transferred through the mechanical linkage to rotate the valve element to an open position.

16 Claims, 8 Drawing Sheets

VALVE ASSEMBLY WITH ROTATABLE ELEMENT

BACKGROUND OF THE INVENTION

In certain applications of fluid flow a valve is in place to control the amount of flow or to stop the flow all together. To achieve this variable flow control, a valve is introduced to a flow passage. One example of a valve is a butterfly valve that includes a disk rotating on an axis across the diameter of a pipe to regulate the flow.

BRIEF DESCRIPTION OF THE INVENTION

In one aspect, the present disclosure relates to a valve assembly, including a linear drive actuator configured to provide a linear driving force to a rotationally constrained output member moveable between a first lateral position and a second lateral position, a rotatable valve element operably coupled to a rotatable drive arm where the rotatable drive arm includes at least one projection operably coupled to the rotationally constrained output member and where the rotatable valve element is configured to rotate between a first position and a second position, and wherein movement of the rotationally constrained output member transfers a rotational force to the rotatable drive arm via the at least one projection such that the rotationally constrained output member applies a rotational force to the drive arm and the operably coupled valve element.

In another aspect, the present disclosure relates to a valve assembly for a valve assembly, including an actuator configured to provide a linear driving force via a rotationally constrained output member, a valve having a rotatable valve element operably coupled to the rotationally constrained output member and where the valve element is rotatable between an opened position and a closed position, and a mechanical linkage physically coupling the rotationally constrained output member and the rotatable valve element, wherein the mechanical linkage is configured to translate the linear driving force from the rotationally constrained output member into rotational motion of the valve element such that the valve element rotates between the opened position and closed position based on the linear driving force.

In yet another aspect, the present disclosure relates to a method of rotating a valve element, including providing a linear driving force to an output portion of an actuator, converting, through a mechanical linkage, the linear driving force of the output portion into a rotational driving force, rotating a valve element from a first position to a second position utilizing the rotational driving force, and wherein the mechanical linkage converts the linear driving forces into a rotational driving force having a varying torque.

DESCRIPTION OF EMBODIMENTS OF THE INVENTION

Figure 1:
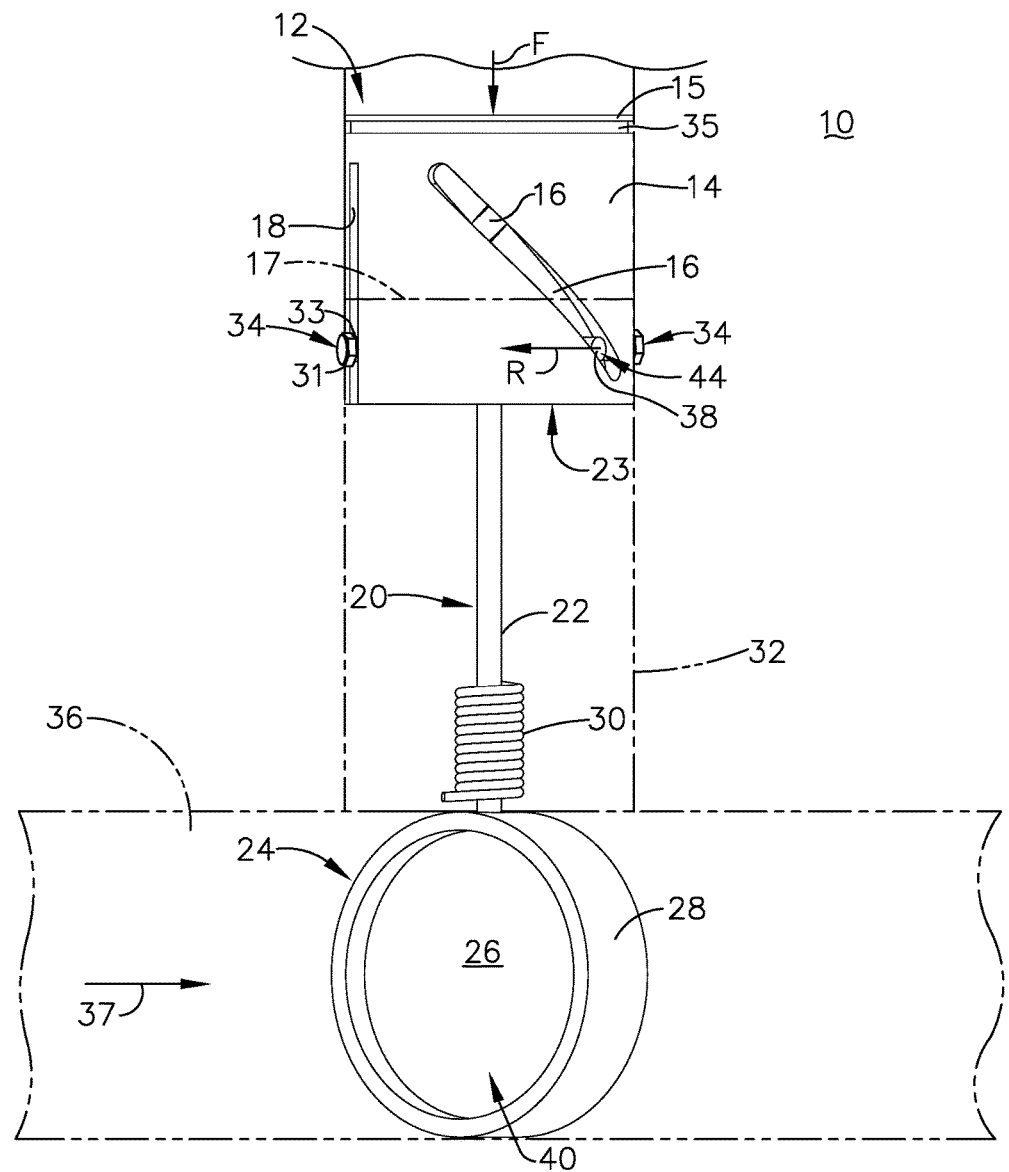
FIG. 1 is a perspective view of a valve assembly in a first position according to aspects of the disclosure described herein.

Aspects of the disclosure described herein relate to a valve assembly. The described valve assembly can be applied in any application in which control of fluid through a pipe or tube is necessary. The fluid can be air, gas, steam, or liquid. FIG. 1 illustrates an exemplary valve assembly 10 in the form of a butterfly valve that includes a linear drive actuator 12 having a rotationally constrained output member. The rotationally constrained output member has been illustrated, by way of non-limiting example, as a piston cylinder 14 moveable between a first lateral position 15 and a second lateral position 17 (illustrated in phantom). A set of yoke slots 16 and at least one guide slot 18 have been illustrated as being included in the piston cylinder 14.

A housing 32 is provided to encompass the piston cylinder 14 and at least a portion of the rotatable drive arm 22. A guide projection 34 is coupled to the housing 32 with, but not limited to, a guide pin 33 mounted the housing 32 with a lug bolt 31. It is also contemplated that the guide projection 34 can include a cam follower or other rotational bearing element to reduce friction during operation. The housing 32 can be filled with, by way of non-limiting example, a fluid (not shown) to initiate motion of the piston cylinder 14 by providing a constant force (F) onto an output portion 35 of the piston cylinder 14. A controller (not shown) can be automated or require direct user input, such as from a user interface, to influence the fluid motion in the housing 32.

A valve element 24 can be provided within a pipe 36 or other suitable cylindrical duct component providing a flow path 37. The pipe 36 can be suitable for any fluid flow in the flow path 37 including liquid, air, or gases. The valve element 24 of the valve assembly 10 includes a seat 28 within the pipe 36. The valve element 24 is substantially centrally disposed in the seat 28 within the flow path 37.

The valve element 24 can be any suitable valve element, by way of non-limiting example the illustrated butterfly valve element having a plate 26. The plate 26 can conform to the shape of the seat 28 so as to seal or close off the flow path 37 when the valve element 24 is in a closed position 40 (FIG. 1). A typical butterfly valve can include a groove circumscribing the plate which can conform to a liner within the seat 28. The seat 28 or plate 26 can integrally include mounting features or such mounting features can be separately formed. Regardless, the valve element 24 is integrated in the seat and configured to rotate between an opened position 53 (FIG. 4B) and a closed position 40 (FIG. 1) where the valve element 24 closes the flow path 37.

It is contemplated that the plate 26, along with the seat 28, has an area substantially the same as the cross sectional area of the flow path 37 formed by the pipe 36. When the valve element 24 is in a closed position 40 it can contact the inner surface of the pipe 36 in which case the seat 28 would not be necessary. It is also contemplated that the seat 28 or a seal can be included within the pipe 36 as illustrated such that the valve element 24 can rest against such a seat 28 or a seal when the valve element 24 is in the closed position. Regardless of whether the seat 28 or a seal is included, it is contemplated that the valve element 24 can completely close or otherwise seal the pipe 36 as illustrated in FIG. 1. When the valve element 24 is in the opened position 53 (FIG. 4B) the plate 26 rotates such that fluid may pass through the flow path 37 defined by the pipe 36. The plate 26 is in-line with the flow path 37 such that the plate 26 minimally hinders fluid flow in the flow path 37.

A mechanical linkage 20 includes a rotatable drive arm 22 extending through a base 23 of the piston cylinder 14 to the seat 28 of the valve element 24. The rotatable drive arm 22 is coupled to the seat 28 through, for example but not limited to, an aperture 25 (FIG. 2) in the seat 28. The rotatable drive arm 22 extends through the aperture 25 (FIG. 2) to the plate 26. The rotatable drive arm 22 can be integrally formed with the plate 26 and can be one continuous piece or be for example, but not limited to, welded or fused together. The plate 26 is operably coupled to the rotatable drive arm 22 and held within or otherwise mounted to the seat 28.

As the valve assembly 10 is often subject to vibrations, a biasing element 30 can be included to bias the valve element 24 to the closed position 40 (FIG. 1). The biasing element 30 can be coupled to the valve element 24 where the rotatable drive arm 22 meets the valve element 24. In the exemplary valve assembly 10, the biasing element 30 is operably coupled to the rotatable drive arm 22 and configured to bias the plate 26 towards the closed position 40. The spring 30 can include, but is not limited to, a torsion spring or coil spring operably coupled to the shaft rotatable drive arm 22 of the valve element 24. In the illustrated example, the biasing element 30 is located exteriorly of the seat 28 within the housing 32.

Figure 2:
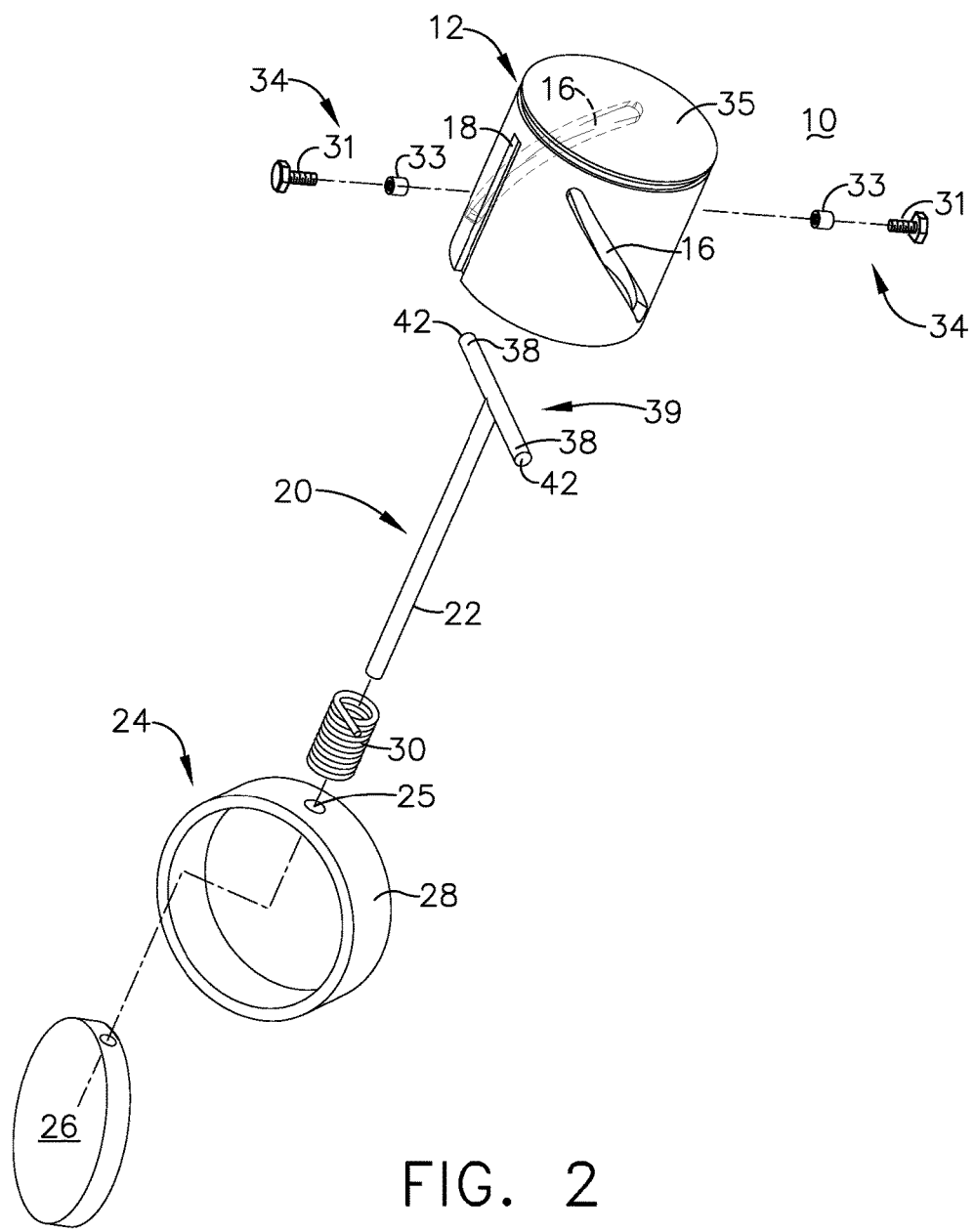
FIG. 2 is an exploded view of the valve assembly of FIG. 1.

FIG. 2 is an exploded illustration of the valve assembly 10 better illustrating portions of the mechanical linkage 20, which physically couples the slidable piston cylinder 14 to the valve element 24. The rotatable drive arm 22 of the mechanical linkage 20 includes at least one projection 38. The rotatable drive arm 22 can include any number of projections to operably couple the rotatable drive arm 22 to the piston 14. A T-bar 39 including two projections 38 with cam-followers 42 is illustrated in FIG. 2. The cam-followers can include, but are not limited to a pin or other rotating bearing element. The T-bar 39 operably couples the piston cylinder 14 to the rotatable drive arm 22 and further to the valve element 24. More specifically, the cam-followers 42 are received within the corresponding yoke slots 16. It will be understood that the mechanical linkage 20 can be an alternative mechanical linkage configured to couple the piston cylinder 14 to the valve element 24.

Figure 3:
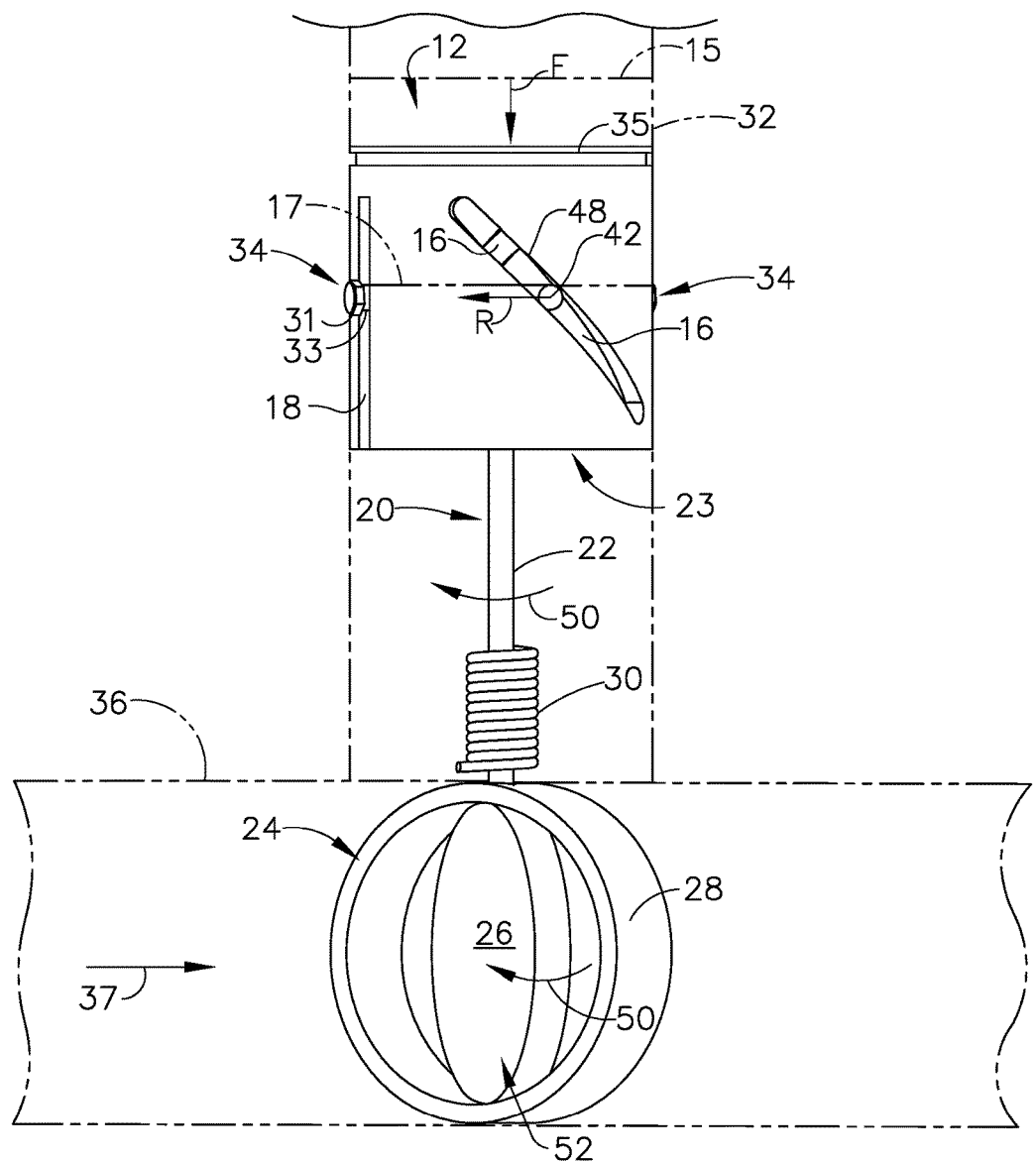
FIG. 3 is a perspective view of the valve assembly of FIG. 1 in an intermediate position.

Referring now to FIG. 3, when the linear drive actuator 12 is engaged such that the constant force (F) is applied, the piston cylinder 14 slides vertically up and down within the housing 32 where the output portion 35 moves between the first lateral position 15 and the second lateral position 17. The guide projections 34 and guide slot 18 are configured to rotationally fix the piston cylinder 14. During the vertical movement, the guide projections 34 are fixed so they remain stationary within the housing 32 guiding the piston 14 in a vertical direction along the guide slot 18.

Figure 4A:
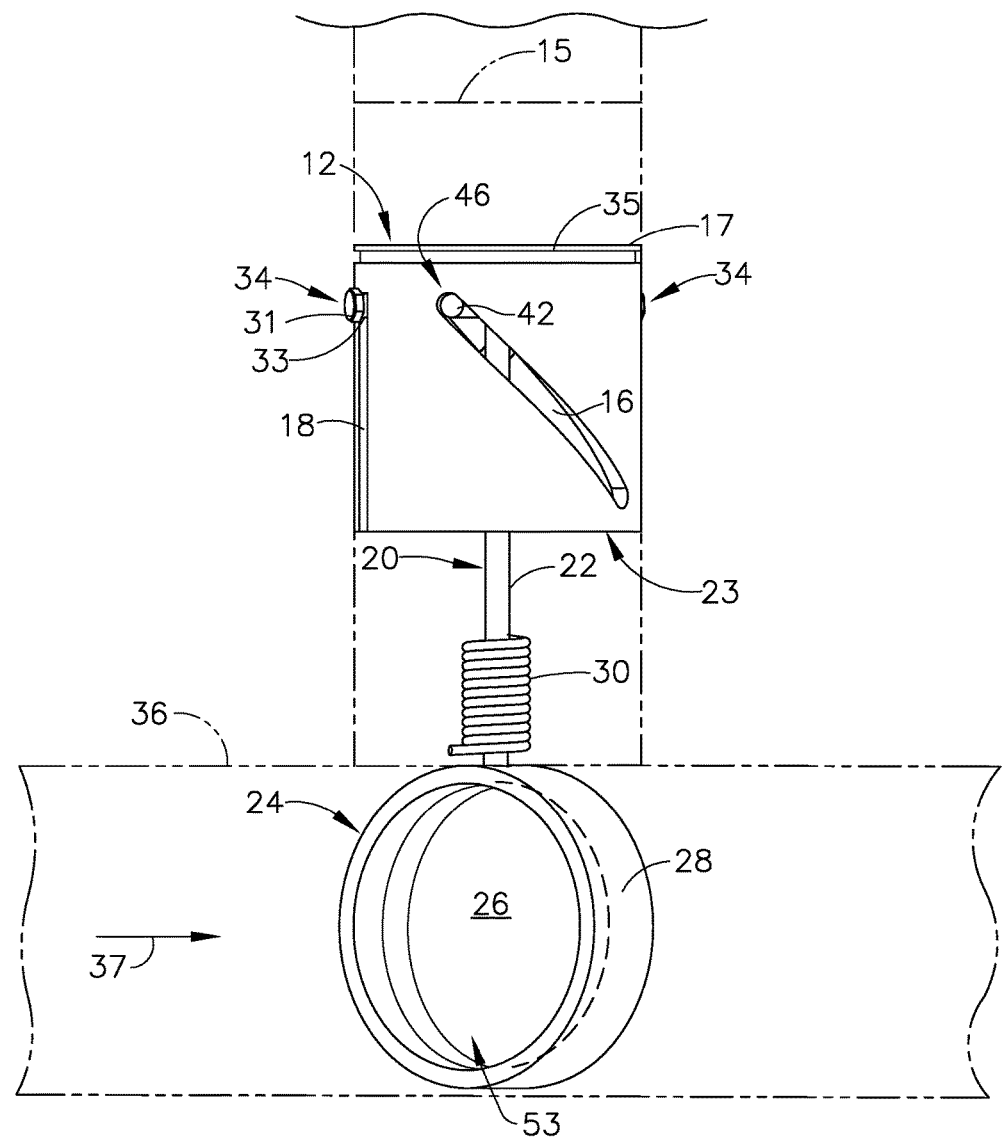
FIG. 4A is a perspective view of the valve assembly of FIG. 1 in an opened position.

The vertical movement of the piston cylinder 14 translates the constant driving force (F) into a rotational driving force (R) through contact between an edge 48 of the yoke slot 16 and the cam-followers 42 of the projections 38. Engaging the cam-followers 42 with the rotational driving force (R) causes the T-bar 38 to rotate from a first position 44 (FIG. 1) to a second position 46 (FIG. 4A). In the illustrated example, the rotation of the mechanical linkage 20, by way of non-limiting example, is to the left or in a clockwise direction 50, providing a varying torque to the valve element 24. The plate 26 also rotates in a clockwise direction 50 providing a partially opened or intermediate position 52.

Turning to FIG. 4A, as the piston cylinder 14 is moved vertically, the cam-followers 42 are guided within the yoke slot 16 and cause rotation of the T-bar 38 and subsequently the rotatable drive arm 22 and the valve element 24. The piston cylinder 14 can come to a stop at lateral position 17. The second position 46 of the cam-followers 42 within the piston cylinder 14 corresponds with an opened position 53 for the valve element 24 where the plate 26 is approximately 70-90° from the closed position 40 (FIG. 1).

Figure 4B:
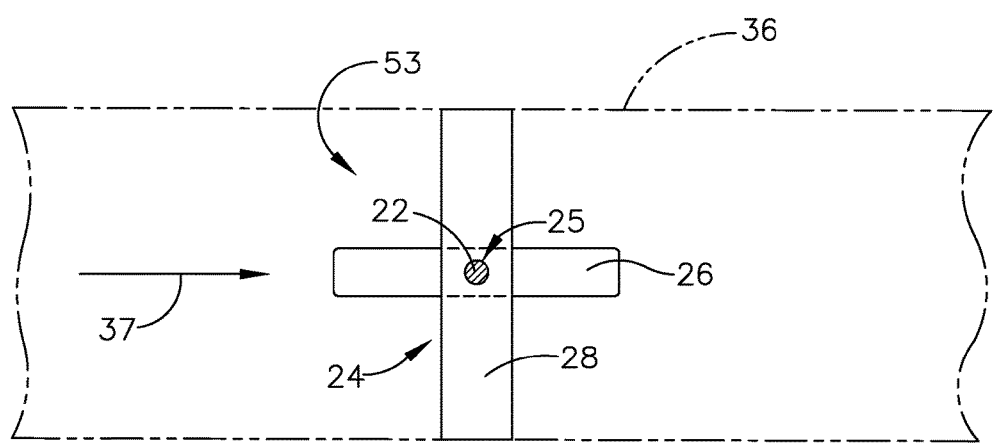
FIG. 4B is a top view of the valve assembly in the opened position of FIG. 4A.

FIG. 4B is a top view perspective of the valve assembly 24 to more clearly illustrate the fully opened position 53 at 900. It can be appreciated that the flow 37 is parallel to plate 26 and subsequently provides little impeding torque to the plate 26. It should be appreciated that a butterfly valve may not rotate a complete 90°. The extent to which the butterfly valve rotates to an opened position 53 depends on how much flow gain is provided at differing stop angles. FIG. 4B provides an illustrative explanation that the torque provided to the plate 26 decreases when the plate 26 is in an opened position 53.

For exemplary purposes an opened position 53 as described herein will be considered at a full 90 degrees of rotation of the plate 26. The opened position 53 of 90 degrees is not meant to be limiting, and the yoke slot 16 profiles described in the following paragraphs can be applied to any range of rotation from a closed to open position of the plate 26.

In moving the plate 26 from the closed position 40 (FIG. 1) through a full 90 degrees of rotational movement to the open position 53 (FIG. 4B), fluid passing through the pipe 36 along flow path 37 interacts with the plate 26 and can contribute to or impede the rotational movement of the plate 26. The impeding torque as described herein counteracts a varying rotational torque resulting from the rotational driving force (R). In the illustrated example, as the plate 26 moves from a closed position 40 (FIG. 1) through a full 90 degrees of rotational movement to an open position 53 (FIG. 4B), the impeding torque created by fluid passing along the flow path 37 is highest between 60 degrees opened and 80 degrees opened.

When the linear driving force (F) is applied to the piston cylinder 14 and translated into the rotational driving force (R) at the beginning of rotation (FIG. 1), by way of non-limiting example when the plate 26 is between zero degrees opened and 40 degrees opened, the fluid in the pipe 36 contributes to the rotational torque, providing little impeding torque against the rotational movement. During this beginning of rotation, a relatively small force is required to open the plate 26. In the exemplary butterfly valve, continuing movement of the plate 26 from 40 degrees opened to 60 degrees opened increases the amount of impeding torque on the plate 26 requiring an increased torque from the translation between the constant linear driving force (F) on the piston to the rotational driving force (R) in order to continue rotating the plate 26. Additionally rotating between 60 degrees opened and 80 degrees opened would require a maximum torque, because this is the range associated with the highest level of impeding torque on the plate 26 created by fluid passing along the flow path 37. A high level of impeding torque would correspond to a high rotational driving force (R). Finally movement of the plate 26 from 80 degrees opened to 90 degrees opened (FIG. 4) corresponds to a smaller torque requirement because the fluid in the pipe 36 provides little impeding torque against the rotational movement of the plate 26.

Figure 5A:
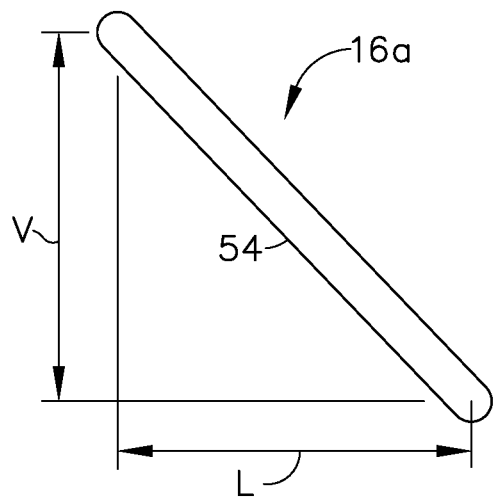
FIG. 5A is a high steep pitch profile for a yolk slot that can be utilized in the valve assembly of FIG. 1.
Figure 5B:
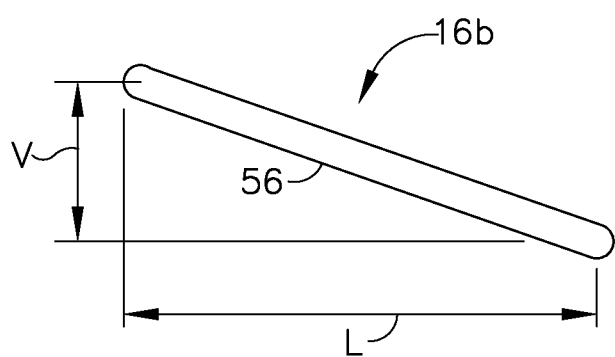
FIG. 5B is a gradual pitch profile for a yolk slot that can be utilized in the valve assembly of FIG. 1.

FIGS. 5A and 5B are two exemplary yoke slots with variable gradients. As explained herein, as the valve element 24 is rotated from a closed position 40 (FIG. 1) to an opened position 53 (FIG. 4B) varying torques are required. The rotational driving force (R) that translates to the varying torque is due to the contact between the projections 38 and the edge 48 of the yoke slot 16 (FIG. 1). Therefore varying the gradient of the yoke slot would change the amount of rotational driving force (R) translated from the constant linear driving force (F). In this manner, a constant linear driving force (F) could provide different rotational driving forces (R) with different gradients.

A closer look at an exemplary yoke slot 16a is illustrated in FIG. 5A. The yoke slot 16a has a steep pitch profile 54 with a substantially steep gradient, approaching a vertical orientation. The steep pitch profile 54 where the lateral movement (L) of the cam-followers 42 is much less than the vertical movement (V) of the piston 14 corresponds to less rotational movement of the plate 26. The steep pitch profile 54 also corresponds to a maximum torque, because the steep gradient enables the driving force (F) to be translated to a larger rotational driving force (R). The steep gradient, as compared to the yoke slot 16, translates the constant linear driving force (F) from the piston cylinder 14 to a relatively large rotational driving force (R) to rotate the mechanical linkage 20 and thus the plate 26. While maximizing the varying torque output, such a pitch profile could inhibit full rotation of the plate 26.

Conversely, as illustrated in FIG. 5B, a gradual pitch profile 56 is illustrated in the yoke slot 16b. This correlates to where the lateral movement (L) of the cam-followers 42 is much greater than the vertical movement (V) of the piston 14 which corresponds to more rotational movement of the plate 26. The gradual pitch profile 56 would translate the linear driving force (F) from the piston cylinder 14 to a relatively small rotational driving force (R) to rotate the mechanical linkage 20 and thus the plate 26. Therefore, although a gradual pitch profile 56 would maximize the rotational movement, it minimizes the varying torque output.

Figure 6:
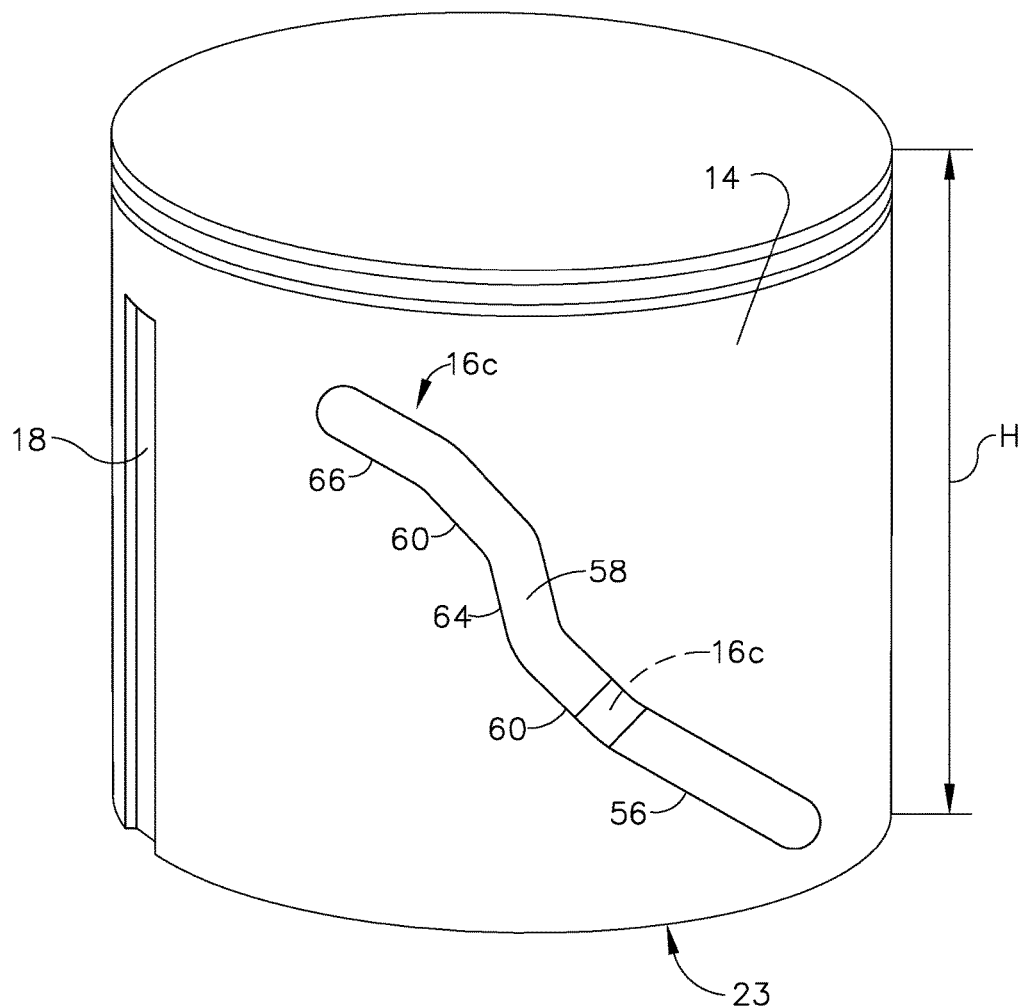
FIG. 6 is a varying pitch profile for a yolk slot that can be utilized in the valve assembly of FIG. 1.

Turning to FIG. 6, considering the changing impeding torque on plate 26, an alternative exemplary yoke slot 16c is contemplated where a varying pitch profile 58 combines the benefits of both the steep pitch profile 54 (FIG. 5A) and the gradual pitch profile 56 (FIG. 5B). The varying pitch profile 58 allows for translating the constant linear driving force (F) on the piston cylinder 14 to the variable torque required. The yoke slot 16c is illustrated as including a varying pitch along a height (H) of the piston cylinder 14. The varying pitch profile 58 for the yoke slot 16c is contemplated such that a gradual pitch profile 66, having a slope like the gradual pitch profile 56 (FIG. 5B), corresponds to rotating the plate 26 from zero degrees opened to 40 degrees opened. At the highest impeding torque, or rotating the plate from 60 degrees opened to 80 degrees opened, a steep pitch profile 64 is provided, having a steep slope like the steep pitch profile 54 (FIG. 5A). Finally the gradual pitch profile 66 is provided as the plate 26 comes to a fully opened position 53. A transition section 60 connects the steep pitch profile 64 central to the varying pitch profile 58 to corresponding gradual pitch profiles 66.

It should be understood that the degree of rotation of the plate 26 corresponding to the different pitch profiles along with the slope values can vary. While contemplated as having multiple gradual pitch profile sections 56 and an intervening steep pitch profile section 54, the varying pitch profile 58 can have any combination of steep and gradual pitch profile sections 54, 56 suitable for the valve assembly 10. It is contemplated that the highest level of impedance for the exemplary butterfly valve would be different than other valve assemblies. A butterfly valve is contemplated herein, other assemblies where a varying pitch profile 58 with a differing combination of pitch profiles can be implemented include, by way of non-limiting example, rack and pinion, scotch yoke, crank arm, and ball valve type valve assemblies.

Figure 7:
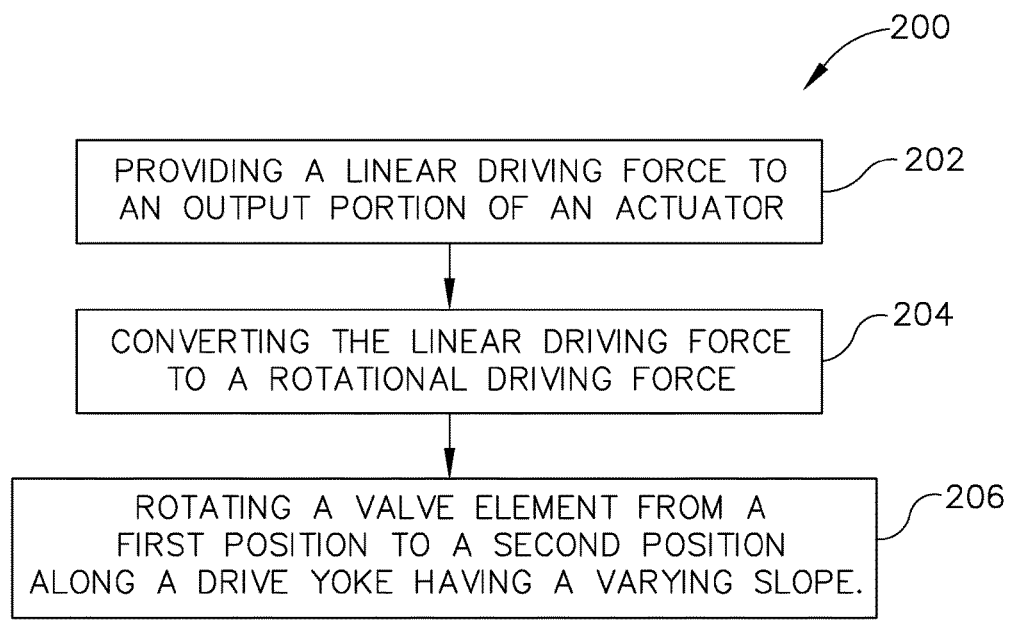
FIG. 7 is a method for rotating the valve assembly according to aspects of the disclosure described herein.

A method 200 of rotating the valve element 24 is illustrated in FIG. 7. The method 200 includes, at 202, providing a linear driving force (F) to the output portion 35 of an actuator described herein as the piston cylinder 14. At 204, converting, through the mechanical linkage 20, the linear driving force (F) of the output portion 35 into the rotational driving force (R) of the rotatable drive arm 22. Then at 206, the valve element 24 is rotated from a first position where the plate 26 is in a closed position 40 (FIG. 1) to a second position where the plate 26 has rotated 90 degrees from the closed position 40 to an opened position 53 (FIG. 4B) by utilizing the rotational driving force (R). The mechanical linkage 20 converts the linear driving force (F) into a rotational driving force (R) with varying torque depending on the varying pitch profile 58 through which the cam-followers 42 move.

The sequence described is for exemplary purposes only and is not meant to be limiting. The method of operation can be in any order as it is understood that the portions of the method may proceed in a different logical order, additional or intervening portions may be included, or described portions of the method may be divided into multiple portions, without detracting the present disclosure. For example, the method 200 can include ceasing operation of the piston cylinder 14 to hold the plate 26 at any given intermediate position 52 between zero and 90 degrees. Further, a spring force such as from the biasing element 30 can be utilized to return the plate 26 to the closed position 40 (FIG. 1).

The valve assembly 10 as described herein uses a rotationally constrained actuated piston with a customizable yolk slot 16 to drive the rotation of the valve element 24. Rotationally constraining the piston cylinder 14 with guide projections 34 allows for translating the linear force to the rotational force (R) to the mechanical linkage 20 when the piston cylinder 14 position changes. The sloped profile of the yolk slot 16 forces the cam-followers 42 to move along the yolk slot 16 and in turn rotate the T-Bar 39 such that the rotatable drive arm 22 rotates the plate 26. It can be further contemplated that additional mechanical advantages can be achieved by changing slopes in the guide slot 18 as well as the yolk slot 16. By way of non-limiting example, on a section of the varying pitch slope 58 that is the steep pitch profile 64, the guide slot 18 could be sloped such that the guide projection 34 contacts the guide slot 18 in such a manner as to produce an additional rotational force (R). The translated rotational force (R) from the edge 48 of the yolk slot 16 to the cam-followers 42 and the additional rotational force from the guide projection 34 to the guide slot would produce a mechanical advantage or higher force in the rotational direction.

Traditionally piston sizing is determined to overcome the maximum torque required. The torque requirements of a valve are typically not linear and the actuator can be sized to overcome the peak requirement such that the actuator can be over designed to produce the work required for rotating the valve element. Aspects of the above disclosure allow for customization of the torque output. Customization is achieved by varying the slopes of the yolk slots to shape the torque output to the desired response. By incorporating a customized pitch profile, the demand and the effort are matched and energy is saved. The varying pitch profile concept also reduces part count, cost, and end item weight, because it is tuned for the specific outcomes rather than for the maximum outcome torque required.

Technical advantages of the aspects of the present disclosure include the ability to accurately deliver a required toque profile to a rotary valve, thus allowing for weight reduction by enabling the use of a smaller actuator in addition to weight reductions gleaned from a simplified drive train. This also allows for a lower cost assembly and a lower weight assembly, which can be important in applications such as those in the aerospace industry.

While the above specification discusses the aspects of the disclosure with respect to a butterfly valve, it will be understood that the aspects of the disclosure can be utilized in any valve assembly.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of rotating a valve element, comprising:
   providing a linear driving force to an output portion of an actuator having a yoke slot;
   converting, through a mechanical linkage, the linear driving force of the output portion into a rotational driving force;
   rotating a valve element from a first position to a second position utilizing the rotational driving force; and
   wherein the mechanical linkage converts the linear driving force into a rotational driving force having a varying torque when the mechanical linkage moves along a gradient of the yoke slot varying between at least a gradual pitch profile section, a transition section, and a steep pitch profile, wherein the transition section has a slope value between a slope value of the gradual pitch profile and a slope value of the steep pitch profile and is located between the gradual pitch profile section and the steep pitch profile section, and each section corresponds to the varying torque.

2. The method of claim 1, further comprising removing the linear driving force and wherein the valve element ceases rotating from the first position to the second position when the linear driving force is removed.

3. The method of claim 2, further comprising providing a biasing force to return the valve element to the first position.

4. A valve assembly, comprising:
   a linear drive actuator configured to provide a linear driving force to a rotationally constrained output member moveable between a first lateral position and a second lateral position;
   a rotatable valve element operably coupled to a rotatable drive arm where the rotatable drive arm includes at least one projection located interiorly of and operably coupled to at least one yoke slot within the rotationally constrained output member the yoke slot having a varying pitch profile comprising at least three pitch profiles, a steep pitch profile, a transition section, and a gradual pitch profile, where the transition section has a slope value between a slope value of the steep pitch profile and a slope value of the gradual pitch profile and is located between the steep pitch profile and the gradual pitch profile, where each profile is defined along a height of the rotationally constrained output member and where the rotatable valve element is configured to rotate between a first position and a second position; and
   wherein movement of the rotationally constrained output member transfers a rotational force to the rotatable drive arm via the at least one projection such that the rotationally constrained output member applies a rotational force to the drive arm and the operably coupled valve element.

5. The valve assembly of claim 4 wherein the output member comprises a rotationally constrained piston cylinder.

6. The valve assembly of claim 5 wherein the at least one projection comprises a T-bar having two cam followers and where each cam follower is located within a corresponding yoke slot in the rotationally constrained piston cylinder.

7. The valve assembly of claim 5 wherein the piston cylinder further comprises a guide-slot configured to receive a guide projection and wherein the guide-slot and guide projection are configured to rotationally fix the piston cylinder.

8. The valve assembly of claim 4 wherein the varying pitch of the yoke slot further comprises multiple gradual pitch profile sections and an intervening steep pitch profile section.

9. The valve assembly of claim 4 wherein the rotationally constrained output member is configured to receive the at least one projection of the drive arm.

10. The valve assembly of claim 4 wherein the rotatable valve element is a butterfly valve element including a plate operably mounted to the drive arm.

11. The valve assembly of claim 4, further comprising a biasing element operably coupled to the drive arm and configured to bias the valve element towards a closed position.

12. The valve assembly of claim 4 wherein the rotatable valve element is provided in a flow path.

13. A valve assembly, comprising:
   an actuator configured to provide a linear driving force via a rotationally constrained output member having a drive yoke with a varying slope comprising at least a gradual pitch profile section, a steep pitch profile section, and a transition section located between the gradual pitch profile section and the steep pitch profile section and having a slope value between a slope value of the steep pitch profile and a slope value of the gradual pitch profile;
   a valve having a rotatable valve element provided within a flow path, operably coupled to the rotationally constrained output member via the drive yoke, and where the valve element is rotatable between an opened position and a closed position; and
   a mechanical linkage physically coupling the rotationally constrained output member and the rotatable valve element;
   wherein the mechanical linkage is configured to translate the linear driving force from the rotationally constrained output member into a rotational driving force, having a varying torque corresponding at least in part to each of the gradual pitch profile section and the steep pitch profile section, driving the valve element such that the valve element rotates between the opened position and closed position.

14. The valve assembly of claim 13 wherein the mechanical linkage comprises a drive arm, operably coupled to the rotatable valve element, the drive arm having cam followers held within the drive yoke included in the rotationally constrained output member.

15. The valve assembly of claim 13, further comprising a biasing element operably coupled to the valve element and configured to bias the valve element towards a closed position.

16. The valve assembly of claim 13 wherein the rotatable valve element is a butterfly valve element including a plate operably coupled to the mechanical linkage.

* * * * *